(12) United States Patent
Elizondo et al.

(10) Patent No.: US 8,783,698 B1
(45) Date of Patent: Jul. 22, 2014

(54) ALL TERRAIN FLOATING ACCESSORIES BUGGY

(71) Applicants: Andy Elizondo, Erick, OK (US); Sheila Elizondo, Erick, OK (US)

(72) Inventors: Andy Elizondo, Erick, OK (US); Sheila Elizondo, Erick, OK (US)

( * ) Notice: Subject to any disclaimer, the term of this patent is extended or adjusted under 35 U.S.C. 154(b) by 0 days.

(21) Appl. No.: 13/915,942

(22) Filed: Jun. 12, 2013

(51) Int. Cl.
B62B 1/00 (2006.01)
B62B 5/00 (2006.01)

(52) U.S. Cl.
CPC .................................. *B62B 5/00* (2013.01)
USPC .................. 280/79.2; 280/644; 280/47.34

(58) Field of Classification Search
CPC ............ B62B 13/18; B62B 1/00; B62B 3/02; B62B 3/00
USPC ......... 280/9.2, 651, 47.34, 8, 9, 39, 644, 79.2
See application file for complete search history.

(56) References Cited

U.S. PATENT DOCUMENTS

| 3,400,942 | A | * | 9/1968 | Hull ............................... 280/39 |
| 3,679,227 | A | | 7/1972 | Rock |
| 5,222,748 | A | * | 6/1993 | Johnson ........................... 280/8 |
| 5,465,996 | A | | 11/1995 | Wisz |
| 6,257,591 | B1 | * | 7/2001 | Abe et al. ...................... 277/591 |
| 6,318,740 | B1 | | 11/2001 | Nappo |
| 6,824,150 | B2 | | 11/2004 | Simione |
| 6,893,030 | B2 | * | 5/2005 | Shapiro ..................... 280/47.34 |
| 7,464,943 | B1 | * | 12/2008 | Poggioli et al. .................. 280/9 |
| 7,823,906 | B2 | * | 11/2010 | Darling, III ................... 280/651 |
| 2008/0066808 | A1 | * | 3/2008 | Stein ........................ 137/355.12 |

* cited by examiner

*Primary Examiner* — Hau Phan
(74) *Attorney, Agent, or Firm* — Crossley Patent Law; Micah C. Gunn

(57) ABSTRACT

An all terrain floating accessories buggy including oversized tires and a tubular, hollow frame disposed around a mesh base, wherein said oversized tires and hollow frame displace a volume of water having mass enough to ensure positive buoyancy of the all terrain floating accessories buggy when porting an extant cooler stocked with cargo through water of a depth exceeding the radius of the oversized tires.

6 Claims, 4 Drawing Sheets

ALL TERRAIN FLOATING ACCESSORIES BUGGY

BACKGROUND OF THE INVENTION

Various types of carts are known in the prior art. However, what is needed an all terrain floating accessories buggy including oversized tires and a tubular, hollow frame disposed around a mesh base, wherein said oversized tires and hollow frame displace a volume of water having mass enough to ensure positive buoyancy of the all terrain floating accessories buggy when porting an extant cooler stocked with cargo through water of a depth exceeding the radius of the oversized tires.

FIELD OF THE INVENTION

The present invention relates to an all terrain floating accessories buggy, and more particularly, to an all terrain floating accessories buggy including oversized tires and a tubular, hollow frame disposed around a mesh base, wherein said oversized tires and hollow frame displace a volume of water having mass enough to ensure positive buoyancy of the all terrain floating accessories buggy when porting an extant cooler stocked with cargo through water of a depth exceeding the radius of the oversized tires.

SUMMARY OF THE INVENTION

The general purpose of the all terrain floating accessories buggy, described subsequently in greater detail, is to provide an all terrain floating accessories buggy which has many novel features that result in an all terrain floating accessories buggy which is not anticipated, rendered obvious, suggested, or even implied by prior art, either alone or in combination thereof.

The present all terrain floating accessories buggy has been devised to enable transport of an extant cooler, stocked with food and beverages as case may be, among other cargo, off road and through waterways, where necessary. The present all terrain floating accessories buggy includes oversized tires and a tubular, hollow frame disposed around a mesh base, wherein said oversized tires and hollow frame displace a volume of water having mass enough to ensure positive buoyancy of the all terrain floating accessories buggy when porting an extant cooler stocked with cargo through water of a depth exceeding the radius of said oversized tires.

The present invention, therefore, includes a lightweight, low-density mesh base having a pair of axles rotatably disposed thereupon. A pair of wheels adorns each axle, and an oversized tire adorns each wheel. The oversized tires displace a volume of water having mass enough to maintain positive buoyancy of the device when toting cargo, as will be described throughout this specification, through water of a depth exceeding the radius of the oversized tires.

A tubular, hollow frame is disposed around a perimeter of the base, enclosing a top side of the base. The hollow frame is also lightweight, and has a volume appropriate for the displacement of a volume of water to enable positive buoyancy of the frame. The hollow frame includes a first member disposed upon one side of the base perimeter and a second member disposed upon an opposing side of the base perimeter. Each of a pair of first angled sections is disposed endwise upon the first member at an obtuse angle along a positive gradient relative the first member, and each of a pair of second angled sections is disposed endwise upon the second member at an obtuse angle along a positive gradient relative the second member.

Each of the pair of first and second angled sections, therefore, rises from each respective first and second member to uphold each of a pair of side members elevated above the base, said side members parallel with the base in a plane perpendicular to the first and second members.

Thus, an extant cooler ported atop the base is maintained within the perimeter of the base by the tubular, hollow frame, when the all terrain floating accessories buggy is transported across uneven ground, off road, and through waterways. The pair of first angled sections prevent said cooler (or other cargo, as case may be) from sliding off the base in a first direction, the pair of second angled sections prevents said cooler from sliding off the base in a second direction, and each of the side members prevents said cooler from falling off either side of the base. Thus, the cooler must be lifted off the base to be removed from the device.

When entering water of a depth greater than the radius of the oversized wheels, the all terrain floating accessories buggy is positively buoyant and cargo ported upon the base is raised above the water level and prevented from washing off the base by the hollow frame. The all terrain floating accessories buggy is therefore usable to transport an extant cooler, and other cargo as desired, over off road routes and across waterways.

Thus has been broadly outlined the more important features of the present all terrain floating accessories buggy so that the detailed description thereof that follows may be better understood and in order that the present contribution to the art may be better appreciated.

Objects of the present all terrain floating accessories buggy, along with various novel features that characterize the invention are particularly pointed out in the claims forming a part of this disclosure. For better understanding of the all terrain floating accessories buggy, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
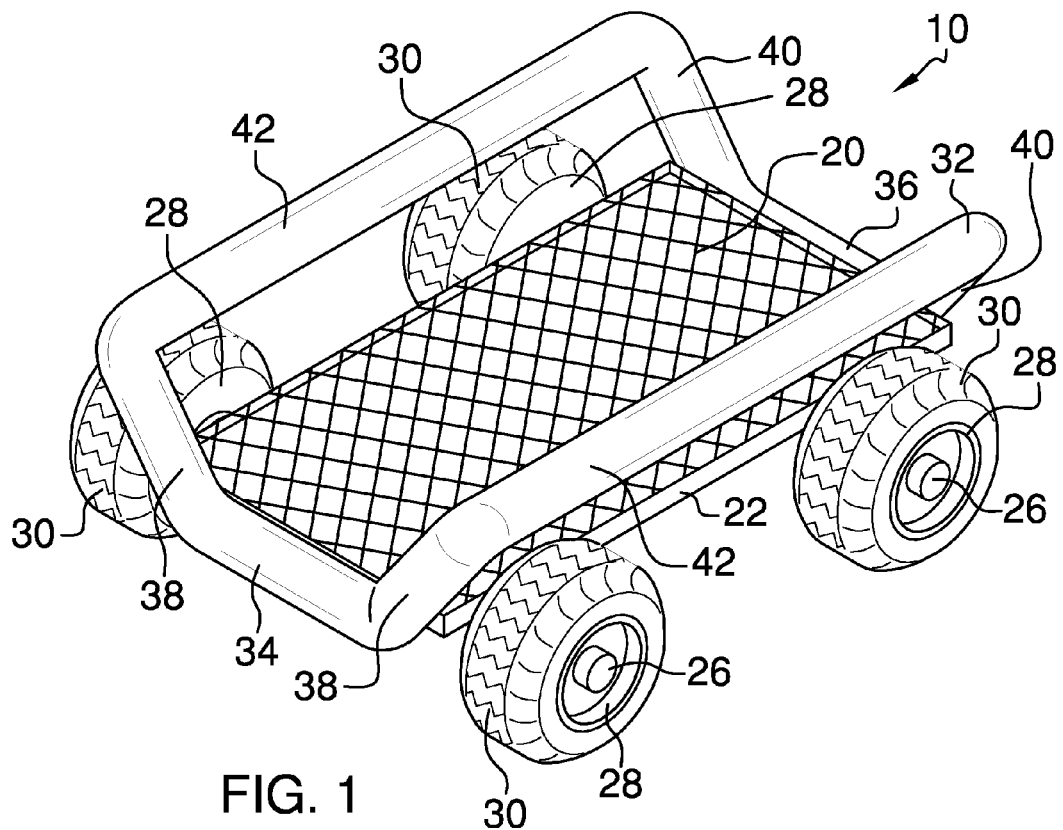
FIG. 1 is an isometric view.
Figure 2:
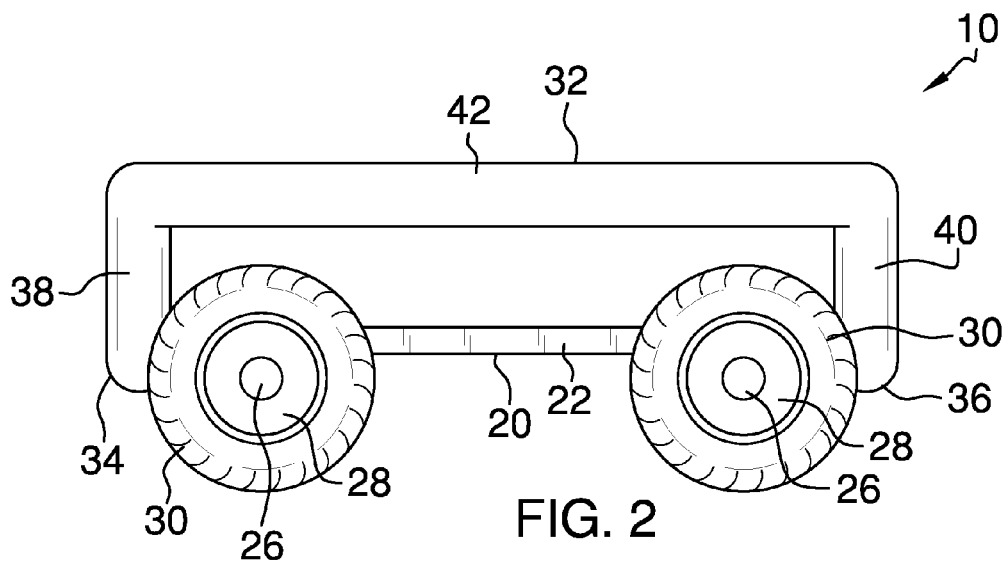
FIG. 2 is a side view.
Figure 3:
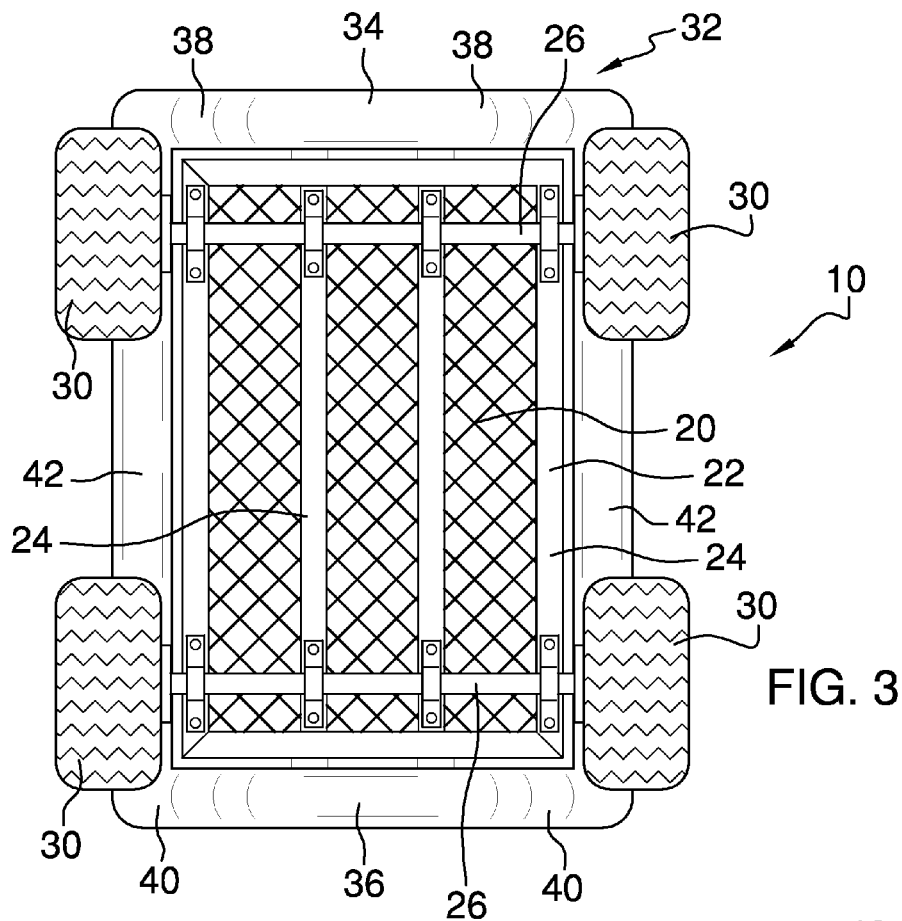
FIG. 3 is a bottom view.
Figure 4:
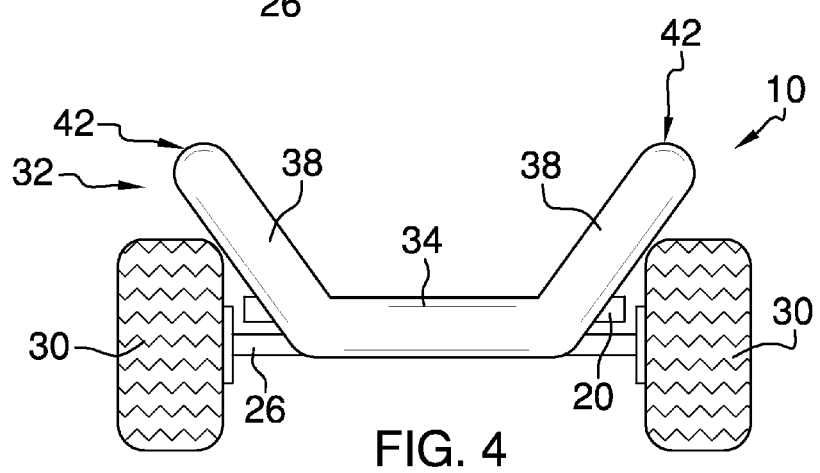
FIG. 4 is a front view.
Figure 5:
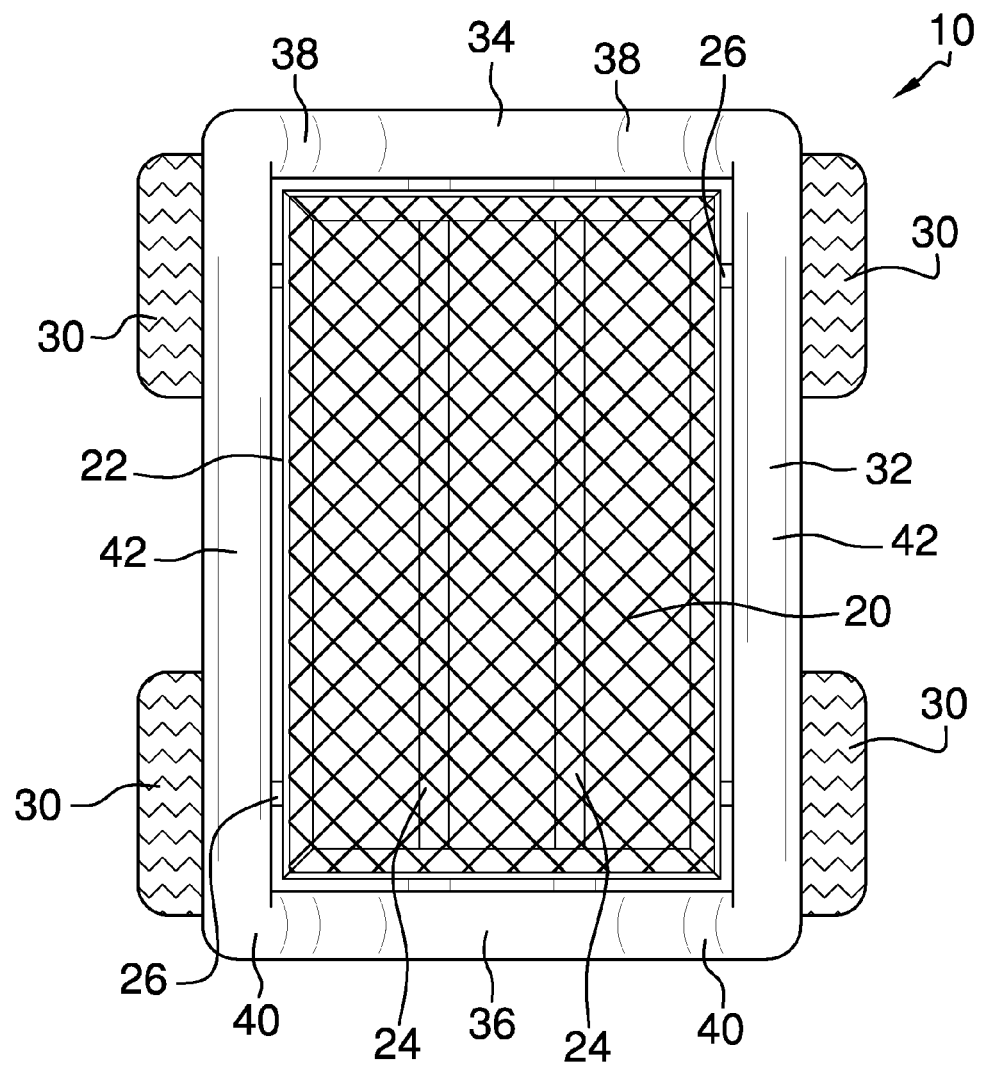
FIG. 5 is a top view.
Figure 6:
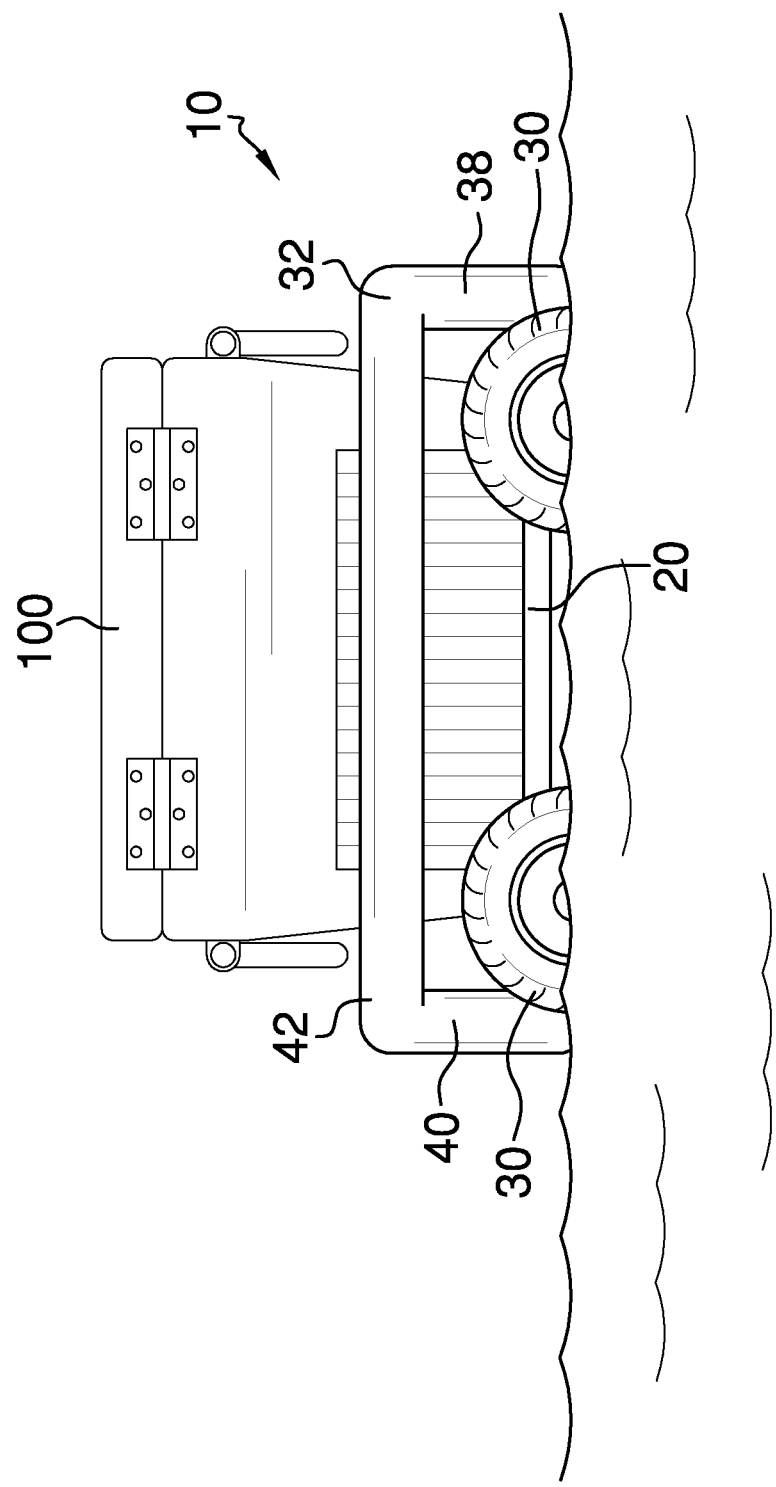
FIG. 6 is an in-use view.

With reference now to the drawings, and in particular FIGS. 1 through 6 thereof, example of the instant all terrain floating accessories buggy employing the principles and concepts of the present all terrain floating accessories buggy and generally designated by the reference number 10 will be described.

Referring to FIGS. 1 through 6 a preferred embodiment of the present all terrain floating accessories buggy 10 is illustrated.

The present all terrain floating accessories buggy has been devised to enable a ready means of transporting an extant cooler stocked with food and beverages across both water and land. The present all terrain floating accessories buggy includes a tubular hollow frame and a plurality of oversized tires, whereby the all terrain floating accessories buggy displaces a volume of water having a mass greater than the all terrain floating accessories buggy and its ported cargo, whereby the all terrain floating accessories buggy maintains positive buoyancy in water deeper than the radius of the oversized wheels.

The all terrain floating accessories buggy, therefore, includes a lightweight, mesh base 20 having a metal perimeter 22 and a plurality of support struts 24 disposed thereupon. The mesh base 20 enables a sturdy platform upon which to carry an extant cooler 100 stocked with food and beverages, for example, among other suitable cargo as may be desired, while decreasing the base's 20 density, whereby a lesser volume of water need be displaced to effect positive buoyancy of the device 10 than would otherwise be required should the base 20 be solid.

A pair of axles 26 is rotatably disposed upon the base 20 and a pair of wheels 28 is disposed endwise upon each of the pair of axles 26. Each wheel 28 supports an oversized inflatable tire 30 there disposed, said oversized tire 30 displacing a necessary volume of water to enable positive buoyancy of the all terrain floating accessories buggy 10 when transported through water at a depth exceeding the radius of each of the oversized tires 30.

A tubular, hollow frame 32 is disposed upon the base 20, surrounding the base 20 to enclose the base 20 whereby an extant cooler 100 is prevented from tumbling from the base 20 during use of the device 10 in off road and watery conditions. The tubular, hollow frame 32, therefore, maintains an extant cooler 100, or other cargo as case may be, within the perimeter of the base 20, while remaining lightweight and displacing a volume of water having a mass in excess of the mass of said hollow frame 32.

The hollow frame 32 includes a first member 34, disposed upon the base 20 perimeter 22 conjunct a first side of the base 20, and a second member 36, disposed upon the base 20 perimeter 22 conjunct a second side of the base 20 in parallel with the first member 34.

Each of a pair of first angled sections 38 is disposed endwise upon the first member 34, each of said pair of first angled sections 38 disposed at an obtuse and opposite angle along a positive gradient relative the first member 34. Likewise, each of a pair of second angled sections 40 is disposed endwise upon the second member 36, each of said pair of second angled sections 40 disposed at an obtuse and opposite angle along a positive gradient relative the second member 36.

Disposed in between each of the pair of first and second angled sections 38, 40, is each of a pair of side members 42. Said pair of side members 42 is disposed perpendicular the first and second members 34, 36, and parallel with, and raised above, the base 20. The tubular, hollow frame 32 therefore surrounds the base 20, conjunct the perimeter 22 at the first and second members 34, 36, and parallel and above the perimeter 22 at each of the pair of side members 42. The gradient of each of the pairs of first and second angled sections 38, 40 is steep enough to accommodate the position of the oversized tire 30 upon the wheel 28 most proximal thereto, whereby rotation of each wheel 28 is unobstructed by the hollow frame 32.

Thus, the present all terrain floating accessories buggy 10 is transportable over uneven ground in the outdoors—the oversized tires 30 readily enable passage off road—and through water wherein each of the oversized tires 30 and the tubular, hollow frame 32 displaces a volume of water having a mass in excess of the mass of the all terrain floating accessories buggy 10, whereby the all terrain floating accessories buggy 10 remains positively buoyant when toting a cargo upon the base 20 through water of a depth in excess of the radius of each of the oversized tires 30.

The preferred embodiment of the all terrain floating accessories buggy 10 presented herein is sized appropriately to displace a volume of water with a mass in excess of the weight of the all terrain floating accessories buggy 10 plus a cargo weighing at least two-hundred pounds.

What is claimed is:

1. An all terrain floating accessories buggy comprising oversized tires and a tubular, hollow frame disposed around a mesh base wherein said oversized tires and hollow frame displace a volume of water having mass enough to ensure positive buoyancy of the all terrain floating accessories buggy when porting an extant cooler stocked with cargo through a depth of water exceeding the radius of each of the oversized tires;

wherein the tubular frame comprises:
a first member disposed upon one side of the base;
a second member disposed upon a side of the base opposite that of the first member;
a pair of first angled sections disposed endwise upon the first member, each of said pair of first angled sections disposed at an obtuse and opposite angle along a positive gradient relative the first member;
a pair of second angled sections disposed endwise upon the second member, each of said pair of second angled sections disposed at an obtuse and opposite angle along a positive gradient relative the second member; and
each of a pair of side members disposed between each of the pair of first angled members and each of the pair of second angled members, each of said pair of side members disposed parallel with, and raised above, the base;
wherein the base is surrounded by the hollow frame.

2. The all terrain floating accessories buggy of claim 1 wherein the base further comprises a lightweight perimeter.

3. The all terrain floating accessories buggy of claim 2 wherein the base further comprises a plurality of support struts.

4. The all terrain floating accessories buggy of claim 3 further comprising a pair of axles rotatably disposed upon the base, each of said axles comprising a pair of wheels disposed endwise thereupon.

5. The all terrain floating accessories buggy of claim 4 wherein the oversized tires and tubular frame displace a volume of water having a mass in excess of the weight of the all terrain floating accessories buggy with cargo weighing at least two-hundred pounds.

6. An all terrain floating accessories buggy comprising:
a lightweight, mesh base having a metal perimeter and a plurality of support struts;
a pair of axles disposed upon the base;
a pair of wheels disposed endwise on each of the pair of axles;
an oversized inflatable tire disposed upon each wheel;
a tubular, hollow frame disposed upon the base, said hollow frame comprising:
a first member disposed upon the metal perimeter conjunct a first side of the base;
a second member disposed upon the metal perimeter conjunct a second side of the base, said second member disposed in parallel with the first member;
each of a pair of first angled sections disposed endwise upon the first member, each of said pair of first angled sections disposed at an obtuse and opposite angle along a positive gradient relative the first member;

each of a pair of second angled sections disposed endwise upon the second member, each of said pair of second sections disposed at an obtuse and opposite angle along a positive gradient relative the second member; and each of a pair of side members disposed endwise between each of the pair of first and second angled sections, each of said side members perpendicular the first and second members, parallel with, and raised above, the base;

wherein each of the oversized tires and the hollow frame displaces a volume of water having a mass in excess of the mass of the all terrain floating accessories buggy, whereby the all terrain floating accessories buggy remains positively buoyant when toting a cargo weighing at least two-hundred pounds upon the base.

* * * * *